(12) United States Patent
Gadow et al.

(10) Patent No.: US 6,998,064 B2
(45) Date of Patent: *Feb. 14, 2006

(54) THERMAL INSULATING MATERIAL AND METHOD OF PRODUCING SAME

(75) Inventors: Rainer Gadow, Aschau am Inn (DE); Guenter Schaefer, Westhofen (DE)

(73) Assignee: MTU Aero Engines GmbH, Munich (DE)

( * ) Notice: Subject to any disclaimer, the term of this patent is extended or adjusted under 35 U.S.C. 154(b) by 18 days.

This patent is subject to a terminal disclaimer.

(21) Appl. No.: 10/619,215

(22) Filed: Jul. 14, 2003

(65) Prior Publication Data

US 2004/0102309 A1     May 27, 2004

Related U.S. Application Data

(62) Division of application No. 09/622,526, filed as application No. PCT/EP99/00982 on Feb. 15, 1999.

(30) Foreign Application Priority Data

Feb. 20, 1998 (DE) ................................ 198 07 163

(51) Int. Cl.
C23C 4/10 (2006.01)
(52) U.S. Cl. .......................... 252/62; 501/152; 501/80; 501/153; 501/84; 501/12; 423/600; 423/263; 264/43; 264/44; 264/42; 264/51; 264/610; 264/628; 264/638; 264/639; 264/650; 264/651; 264/667; 264/681
(58) Field of Classification Search ................. 252/62; 501/152, 80, 153, 84, 12; 423/600, 263; 264/43, 44, 42, 51, 610, 628, 638, 639, 650, 264/651, 667, 681
See application file for complete search history.

(56) References Cited

U.S. PATENT DOCUMENTS

| 4,542,111 A | 9/1985 | Buran et al. |
| 4,606,846 A | 8/1986 | Kahn et al. |
| 5,415,946 A | 5/1995 | Friz |
| 5,447,894 A | 9/1995 | Yasuoka et al. |
| 5,830,822 A | 11/1998 | Euzen |
| 5,849,659 A * | 12/1998 | Tanaka et al. ............. 502/324 |
| 6,602,814 B1 * | 8/2003 | Gadow et al. ............. 501/152 |

FOREIGN PATENT DOCUMENTS

| JP | 4-338167 | 11/1992 |
| WO | 96/28384 | 9/1996 |
| WO | WO 96/28384 | * 9/1996 |

* cited by examiner

Primary Examiner—C. Melissa Koslow
(74) Attorney, Agent, or Firm—Harness, Dickey & Pierce, P.L.C.

(57) ABSTRACT

A thermochemically stable oxidic thermal insulating material presenting phase stability, which can be used advantageously as a thermal insulating layer on parts subjected to high thermal stress, such as turbine blades or such like. The thermal insulating material can be processed by plasma spraying and consists preferably of a magnetoplumbite phase whose preferred composition is $MMeAl_{11}O_{19}$, where M is La or Nd and where Me is chosen from among zinc, the alkaline earth metals, transition metals, and rare earths, preferably from magnesium, zinc, cobalt, manganese, iron, nickel and chromium.

57 Claims, 12 Drawing Sheets

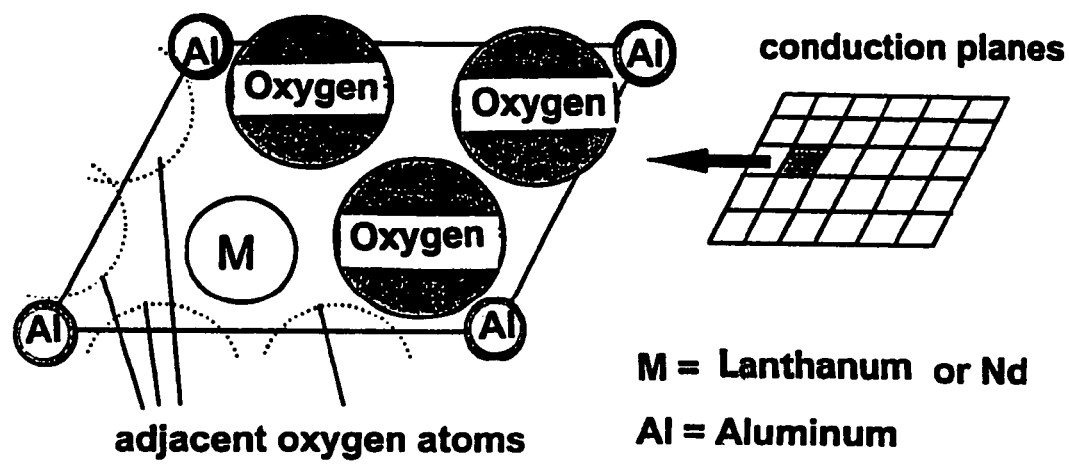
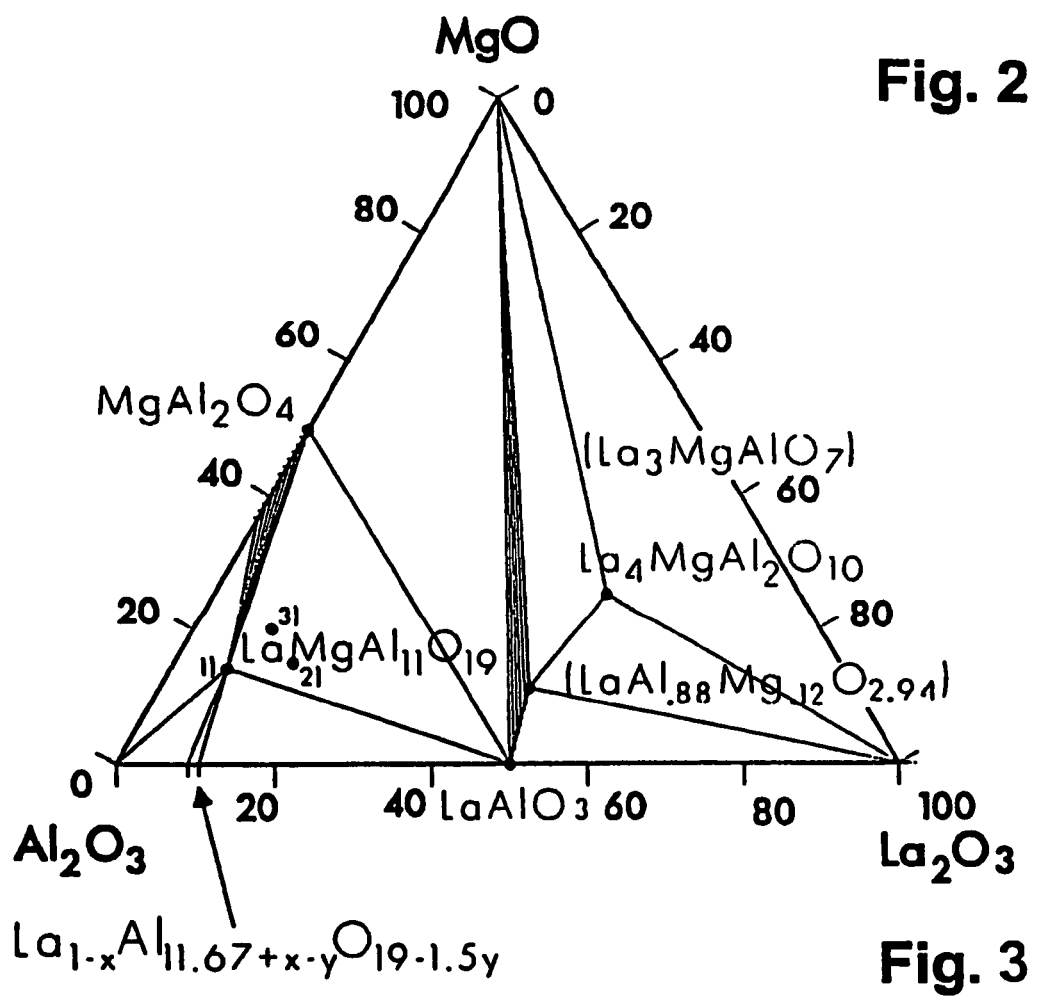
Fig. 2
Fig. 3

THERMAL INSULATING MATERIAL AND METHOD OF PRODUCING SAME

This is a division of Ser. No. 09/622,526 filed Oct. 11, 2000, now U.S. Pat. No. 6,602,814, which is a 371 of PCT/EP99/00982, filed Feb. 15, 1999.

The invention relates to a thermal insulating material, which is particularly suited for high temperature applications far above 1000° C. and can be employed in gas turbines, aeroplane engines, power station turbines and other highly, thermally loaded parts, for example in vehicle construction and energy technology.

The invention further relates to a method for producing and processing such a thermal insulating material.

The known thermal insulating materials specifically employed for high temperature applications in heat-power machines and in industrial plants are oxide cover layers applied to a metal substrate, for example on a highly alloyed nickel base material in a turbine blade. The classical thermal insulating layer consists of tetragonal or stabilised $ZrO_2$ as a cover layer, which is usually applied to an additional intermediate layer in the form of a low melting point or soft coupling layer (HVS). The coupling layer is composed substantially of aluminum and yttrium, frequently also with amounts of platinum and palladium (up to 10 wt.-%), apart from further components (nickel, chromium, cobalt), to make it more oxidation resistant. The ceramic cover layer is most often applied by atmospheric plasma spraying (APS). Newer developments concern $ZrO_2$ layers vapour-deposited with electron beams (electron beams physical vapour deposition, EB-PVD-$ZrO_2$-layers). The requirements on the ceramic $ZrO_2$ cover layer and the coupling layer have increased continuously in recent years. Their stability under alternating temperatures, their protective effect against oxidation as well as their long-term stability and adhesion at higher temperatures of the exhaust gas for increased efficiency have been optimised.

As a disadvantage of the known thermal insulating layers on the basis of $ZrO_2$ it has been found that layers applied by plasma spraying or CDV and EB-PVD layers of stabilised $ZrO_2$ are not sufficiently resistant above 1100° C. The $ZrO_2$ layers age rapidly at temperatures above 1100° C.

This aging process leads to a partial densification of the layer and parallel to that the elasticity modulus of the layer increases. The density increase diminishes the original uniform fine porosity of the layer and the thermal conductivity increases. The increase in elasticity modulus of the ceramic layer means that the thermal shock resistance decreases and the "tolerance" or the capability of compensating for thermal expansion with highly different thermal expansion coefficients between the ceramic layer and the metallic substrate decreases. Both processes, the density increase and the increase in elasticity modulus lead to a peeling of the $ZrO_2$ cover layer during the temperature cycles in a turbine.

In addition to deterioration the pure mechanical properties of the cover layer, the three dimensional sintering of the $ZrO_2$ layer leads to the formation of a dense ceramic with other properties than that of the porous layer. Since $ZrO_2$ is a very good conductor of ions, the ever present oxidative degradation in the entire ceramic-metal composite is not altered by densification of the ceramic. The coupling layer oxidises in this process and a layer of oxidation products with other properties forms between the original coupling layer and the ceramic cover layer. The original ceramic layer thus in the end breaks up due to the altered mechanical properties of the layer system. The corrosion of the coupling layer continues despite the sometimes very dense ceramic surface.

The object of the present invention is therefore to provide an improved thermal insulating material which is better suited for high-temperature applications and is particularly suited for coating turbine blades and similar high temperature components.

Furthermore, a suitable method for producing and processing such thermal insulating materials is to be provided.

According to the invention, this object is solved by a thermal insulating material composed a first component with at least one first phase containing stoichiometrically 1 to 80 mol-% of $M_2O_3$, 0 to 80 mol-% MeO and a remainder of $Al_2O_3$ with incidental impurities, wherein M is selected from the elements lanthanum and neodymium or mixtures thereof and wherein Me is selected from zinc, alkaline earth metals, transition metals, and the rare earths or mixtures thereof, preferably selected from magnesium, zinc, cobalt, manganese, iron, nickel, chromium, europium, samarium or mixtures thereof.

An effective thermal insulation is made possible with the insulating material of the invention, also at temperatures of 1300° C. and up to over 1500° C., whereby at the same time sintering processes and the resultant ageing and grain enlargement compared to $ZrO_2$ are greatly slowed down or retarded.

In a preferred embodiment of the invention, the first component contains 1 to 80 mol-% $M_2O_3$ and 0.5 to 80 mol-% MeO with a remainder of $Al_2O_3$.

It has been shown to be of advantage when the first component comprises 1 to 50 mol-% $M_2O_3$ and 1 to 50 mol-% MeO with a remainder of $Al_2O_3$.

It is further preferred when the first component comprises 1 to 20 mol-% $M_2O_3$ and 2 to 30 mol-% MeO with a remainder of $Al_2O_3$.

Furthermore, it has been shown to be of advantage when the first component comprises 2 to 20 mol-% $M_2O_3$ and 5 to 25 mol-% MeO with a remainder of $Al_2O_3$.

Particularly preferred is the first component comprising 5 to 10 mol-% $M_2O_3$, about 10 to 20 mol-% MeO with a remainder of $Al_2O_3$.

Particularly advantageous properties result when the first component comprises about 5 to 9 mol-% $M_2O_3$, about 12–17 mol-% MeO with a remainder of $Al_2O_3$, whereby a composition with about 7.1 mol-% $M_2O_3$, about 14.3 mol-% MeO and a remainder of $Al_2O_3$ represents an optimal composition.

The first phase preferably forms a hexa-aluminate phase of magnetoplumbite structure of the composition $MMeAl_{11}O_{19}$, which when using lanthanum as M and magnesium as Me is known as magnesium aluminum lanthanum oxide with the formula $MgAl_{11}LaO_{19}$.

This material consists mainly of aluminum oxide in which monolayers of lanthanum oxide and aluminum oxide are disposed at regular spacings. This insertion of $La_2O_3$ leads to the formation of a layered structure with a characteristic plate-like structure of the crystals. This magnetoplumbite phase only forms in a narrowly restricted composition region. The typical composition $LaAl_{11}O_{18}$ due to its structure has very many cationic (about 8% Al) and anionic (about 5% O) vacancies in the lattice, which allow the diffusion of atoms through the structure. The homogeneity region of the phase is extended to $LaMgAl_{11}O_{19}$ by doping with bivalent cations having a small ionic radius (typically $Mg^{++}$, $Mn^{++}$, $Co^{++}$, $Zn^{++}$, etc.). In this ideal composition $LaMgAl_{11}O_{19}$ the compound has nearly no more possibility of altering its composition.

With a further increase in the doping with MgO and $La_2O_3$ (or MeO and $M_2O_3$) further defects form in the structure and a multiphase region forms including $LaMgAl_{11}O_{19}$, $MgAl_2O_4$, $LaAlO_3$ and MgO.

In the optimal composition according to the invention, the addition of MeO leads to a decrease in the lattice vacancies. This means that the material with the composition $LaMgAl_{11}O_{19}$ ($MMeAl_{11}O_{19}$) has absolutely no more crystal defects in the structure or formulated in another way, all of the vacancies in the structure are occupied by Me (Mg) and an additional O atom. This complete occupancy of all lattice sites in the structure leads to the desired high thermochemical stability and phase stability in the temperature region above 1100° C.

A further important advantage of the thermal insulating material of the invention is that the material is substantially inert with respect to alkali compounds ($Na_2O$, NaCl, $K_2O$, KCl) of the combustion gas or the surrounding atmosphere.

Previous thermal insulating materials based on $ZrO_2$ form low melting point phases with the hydroxides or carbonates of $Na_2O$ and $K_2O$ or with the NaCl contained in the atmosphere in winter or near the sea, which lead to a strong densification of the sprayed layer at temperatures of 1000° C. In contrast, such attacks on the thermal insulating material of the present invention lead more to an increased plate growth, which subsequently makes densification, i.e. the sintering of the cover layer substantially more difficult.

A further advantage of the thermal insulating material of the present invention is a favourable thermal expansion coefficient, which lies between 9.5 and $10.7 \times 10^{-6}$ $[K^{-1}]$ in a temperature range between room temperature and 1200° C. and thus in a range favourable for coating highly heat resistant steels, which have an expansion coefficient of about 10 to $12 \times 10^{-6}$ $[K^{-1}]$.

With the thermal insulating material of the present invention, the application of a thin, very effective thermal insulating layer is possible on a body, for example made of chromium nickel steels, which have an exceptionally high temperature resistance and long-term stability and by which a peeling of the thermal insulating layer from the base material is effectively avoided even after numerous thermal cycles.

The thermal insulating material of the present invention is preferably applied by thermal spraying, in particular by plasma spraying as a thermal insulating layer on a body to be coated.

To achieve a preferred crystallisation of the aluminate during the plasma spraying and to increase adhesion and thermal shock resistance, the material can additionally comprise a second component which preferably is substantially insoluble in the hexa-aluminate phase and preferably is added to the first component in an amount of about 0.001 to 20 wt.-%, in particular about 0.1 to 10 wt.-%, whereby the range of 0.1 to about 3 wt.-% is particularly preferred.

The second component can comprise at least one of the compounds $ZrO_2$ in monoclinic, tetragonal or cubic form, $La_2Zr_2O_7$, $MgZrO_3$, $Nd_2O_3$, $HfO_2$, $Y_2O_3$, $Yb_2O_3$, $Eu_2O_3$, $La_2Hf_2O_7$, $MgHfO_3$, oxides or salts of the alkali metals sodium, potassium, lithium or mixtures or alloys of these compounds.

If $ZrO_2$ is added in tetragonal or cubic form, then preferably it is doped with MgO, CaO or $Y_2O_3$.

Concerning the salts of the alkali metals sodium, potassium and lithium, which can also be added as a doping of the first component, these can be carbonates, chlorides, nitrates, acetates, formates, citrates, sulphates, hydrogen carbonates or mixed salts of these metals.

The thermal insulating material of the present invention is preferably first produced in powder form and then subsequently applied as a thermal insulating material to a component, for example by plasma spraying, or is processed to produced massive components using powder technology methods or is further processed to a ceramic foam.

According to a first alternative, the powder-like thermal insulating material is produced by adding an insoluble oxide, a hydroxide or an oxygen hydrate of $Al_2O_3$ as the starting material to an aqueous or alcoholic medium, in particular methanol, ethanol or isopropanol, and mixtures thereof, the remaining portions of the first component being soluble salts, preferably carbonates, hydrogen carbonates or acetates. The starting material is dissolved in the medium, the formed suspension is dried, preferably after a grinding and dispersion step, preferably spray dried, and the resulting powder is subsequently subjected to an annealing treatment.

A relatively uniform distribution and a good mixing of the various additives is achieved in this wet chemistry process, by which an insoluble carrier powder is coated. The subsequent annealing treatment is preferably carried out at temperatures of 500 to 1800° C. in the presence of air for a duration between about 0.5 and 20 hours. The annealing process, for example in a rotary oven, produces a single-phase, oxidic agglomerate with an average diameter of between about 1 and 200 $\mu$m and with a specific surface area between 0.1 and 40 $m^2/g$.

According to a second alternative for the powder production, the compounds of the first component are mixed in powder form as oxides or salts in a mixer, preferably a drum or tumbling grinder, where preferably grinding bodies of $Al_2O_3$ or stablised $ZrO_2$, or mixtures of $Al_2O_3$ and $ZrO_2$ are employed. The powder is subsequently granulated and subjected to an annealing treatment.

This so-called "mixed oxide method" is the simplest variation for production, however, it is somewhat more difficult to obtain a homogeneous mixture. At first the produced powder still has several phases even after the mixing process.

The multiphase oxide mixture is preferably treated with binders and granulated before the annealing treatment is carried out, which is also preferably performed in the presence of air, preferably for a duration between 0.5 and 20 hours in a temperature range of between about 300° C. and 1800° C.

A homogeneous oxidised powder is formed by the annealing process, where the granulates have an average diameter of between about 1 and 200 $\mu$m and a specific surface area between 0.1 and 40 $m^2/g$.

Conversely, if the mixing is performed as mentioned above in a liquid medium or one works with a suspension having a high content on solids, then a drying is initially carried out, preferably by spray drying, before the subsequent annealing treatment.

A third alternative for producing the powder-like thermal insulating material is producing the powder by a sol-gel process with subsequent drying and annealing.

A particularly good chemical homogeneity and a complete phase transition during the annealing is achieved when using a sol-gel process. The powder produced by the sol-gel process is particularly fine grained and is well suited for subsequent processing by powder technology methods or by plasma spraying.

In the sol-gel process, alcoholates are preferably produced from the starting materials in the desired mass ratios, subsequently solid components are precipitated out of the solution, preferably by the addition of water of by pH adjustment. The solid components are subsequently annealed at temperatures of between about 500° C. and 1700° C.

In a variation of this process, organic binding agents are additionally added after the precipitation of the solid components and then the subsequent separation of excess solution takes place, before the drying, preferably spray drying, and finally the annealing treatment follows. The annealing is preferably performed at temperatures between 500° C. and 1200° C.

In both variations, alcoholate compounds of the form ($-OC_nH_{2n+1}$) are used, whereby $-OC_nH_{2n+1}$ means methoxy, ethoxy, isopropoxy, propoxy, butoxy or isobutoxy alcoholates with $1 \leq n \leq 5$.

Alternatively, water soluble salts of M (lanthanum or neodymium) or Me (in particular magnesium), preferably as an acetate, citrate, carbonate, hydrogen carbonate, formate, hydroxide or nitrate, can be added to a solution of aluminum alcoholate and subsequently precipitated.

If the material comprises a second component, this takes place according to a further embodiment of the invention in the liquid state, in which the second component is added in soluble form before the drying or precipitation takes place (as long as the sol-gel process is being used).

In contrast, in the dry method (mixed oxide method) the compounds of the second component are added as a powder and annealed together with the other compounds and are brought to chemical reaction in the solid phase.

As mentioned above, the thermal insulating material of the present invention can be applied either in powder form by plasma spraying onto the part to be coated or can be subsequently processed using powder technology methods, for example by axial cold pressing, isostatic cold pressing or slip casting and subsequent sintering, preferably under a slightly reducing atmosphere at temperatures of at least about 1500° C. or by extruding or casting foils with the corresponding subsequent heat treatment to produce larger articles.

According to another variation of the invention, the powder can also be produced in a ceramic foam, namely by filling a polymer foam with slip whereafter the solvent is preferably evaporated at temperatures between 200° C. and 400° C. or by adding a suspension of the powder to a low viscosity polymer, which is then foamed with a foaming agent, and finally in both variations carrying out an annealing treatment, preferably at first in a range between 900° C. and 1100° C. and finally at about 1400° C. to 1700° C.

It will be understood that the features of the invention are not only applicable in the given combinations but may also be used in other combinations or taken alone without departing from the scope of the invention.

The invention will now be discussed in more detail in conjunction with the drawings.

FIG. 2 shows a schematic illustration of the occupation of a mirror plane in the magnetoplumbite phase;

FIG. 3 shows the phase diagram of the system $La_2O_3/Al_2O_3/MgO$ (in mol-%);

STRUCTURE OF THE THERMAL INSULATING MATERIAL ACCORDING TO THE INVENTION

Figure 1:
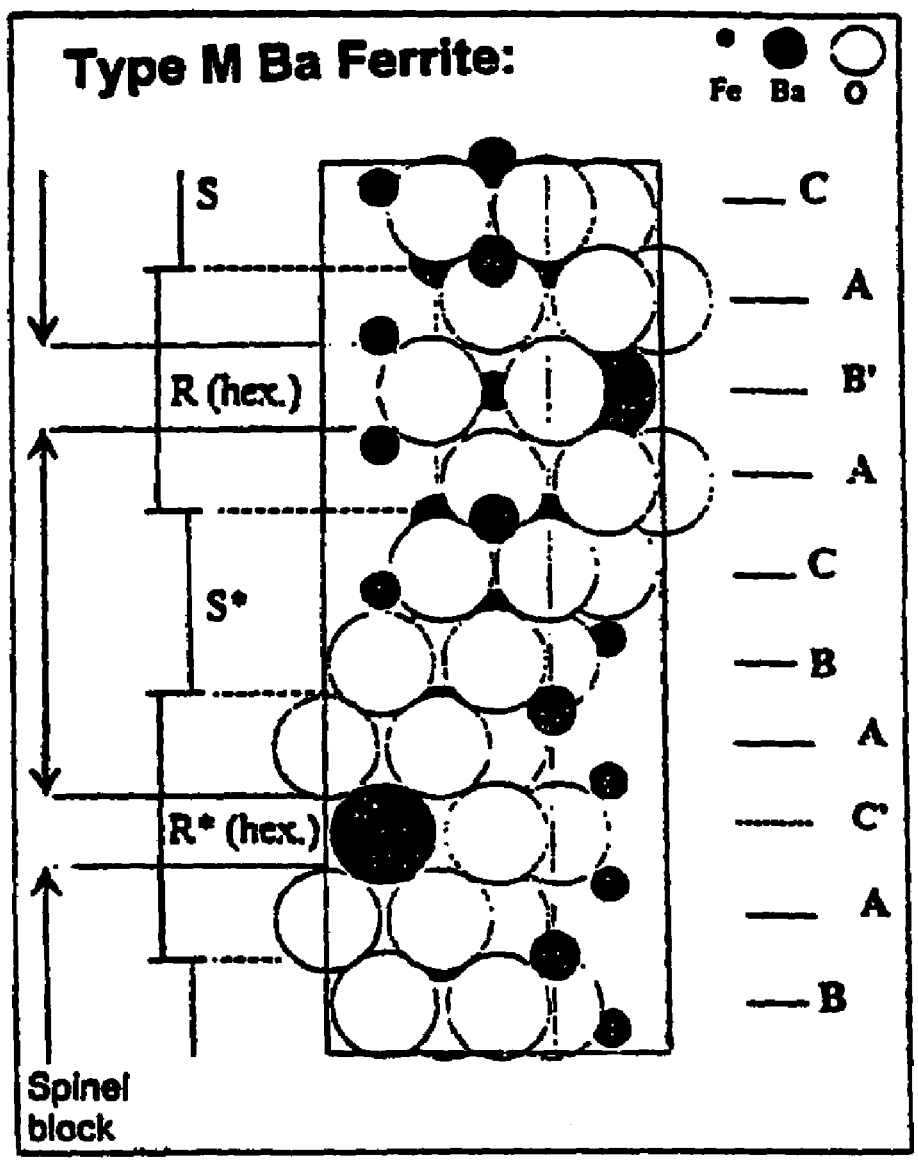
FIG. 1 shows an illustration of the crystallographic unit cell of the magnetoplumbite phase.

The thermal insulating material of the present invention consists of an oxidic cover layer, which in contrast to the zirconium oxide sinters not in three dimensions, but preferably in two dimensions. The material consists mainly of aluminum oxide, where monolayers of lanthanum oxide or neodymium oxide and aluminum oxide are disposed in its crystal lattice at regular spacing (see FIG. 2). An illustration of the crystallographic unit cell of the magnetoplumbite phase with reference to a barium ferrite is shown in FIG. 1. The insertion of $La_2O_3$ leads to the formation of a layered structure with a very characteristic, plate-like structure of the crystals which is clearly seen in FIG. 4. The hexa-aluminates form a magnetoplumbite phase in a very restricted region of the composition. A typical composition is $LaAl_{11}O_{18}$. However, this composition due to its structure has many cationic (Al) and anionic (O) vacancies in the lattice, which allow a diffusion of atoms through the structure. By doping with bivalent cations having a small ionic radius (typically MgO, MnO, CoO, ZnO, generally referred to as MeO), the homogeneity of the phase is extended up to $MMeAL_{11}O_{19}$ ($LaMgAl_{11}O_{19}$). In this ideal composition $LaMgAl_{11}O_{19}$, the compound has practically no more possibility in varying its composition (see the phase diagram of FIG. 3). The homogeneity region is illustrated in the phase diagram starting from the specimen 1) and extending to either side. The ideal composition of the phase $LaMgAl_{11}O_{19}$ is found at the point with the designation 1), while the composition of the phase $LaAl_{11}O_{18}$ (binary system without the addition of MgO) can be read off from the lower line between $Al_2O_3$ and $La_2O_3$ in the region of about 90 mol-% $Al_2O_3$. The points 1), 2) and 3) in the phase diagram indicate the specimens which were subjected to corrosion tests.

The thermal insulating material generally follows the formula $M_2O_3$-xMeO-y$Al_2O_3$, whereby M is lanthanum or neodymium and the coefficients x,y represent the preferred ranges of the composition with $0.2 \leq x \leq 3.3$ and $10.0 \leq y \leq 13$. The components of the ideal composition $LaMgAl_{11}O_{19}$ can be read from the phase diagram at the point 1) with about 7.1 mol-% $La_2O_3$, about 14.3 mol-% MgO and about 78.6 mol-$Al_2O_3$.

Thus, a decrease in the lattice vacancies can be achieved in the thermal insulating material of the present invention by doping with MeO (e.g. MgO). This means that the material with the composition $MMeAl_{11}O_{19}$ has absolutely no crystal defects in the structure, or formulated differently, all of the vacancies in the structure are occupied by Mg and an additional O atom. This complete occupation of all lattice sites in the structure leads to the desired high stability in the temperature range above 1100° C.

Verification

The magnetoplumbite phases can be relatively easily substantiated by means of XRD (X-ray powder diffractometry), since the JCPDS cards (26-0873, see Table 1) for the $LaMgAl_{11}O_{19}$ phase and (33-0699, see Table 2) for the $LaAl_{11}O_{18}$ phase are known and the characteristic interferences or the reflection signals, respectively, can be determined.

Figure 7:
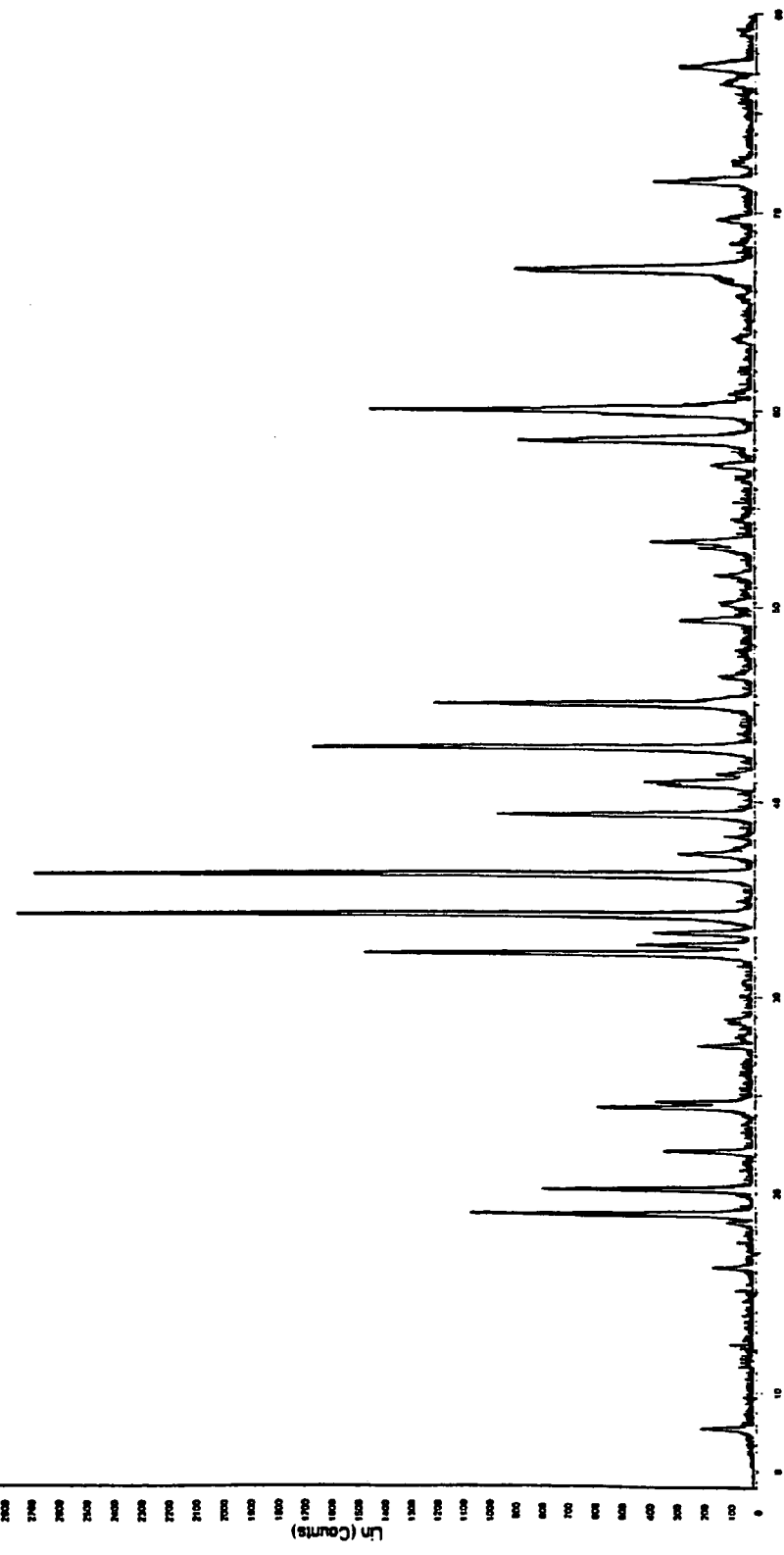
FIG. 7 shows the results of an X-ray powder diffraction scan on a powder produced via the wet route, from which the magnetoplumbite phase is easily verified on the basis of the JCPDS cards for the $LaA_{11}O_{18}$ phase and the $LaMgAl_{11}O_{19}$ phase according to Table 1 and Table 2.

The magnetoplumbite phases are very easy to verify with X-ray techniques on the basis of the JCPDS cards, since very many reflections occur and they are very characteristic in their arrangement for the structure (see FIG. 7). In contrast to this, $ZrO_2$ only shows a very simple diffraction pattern.

Figure 5:
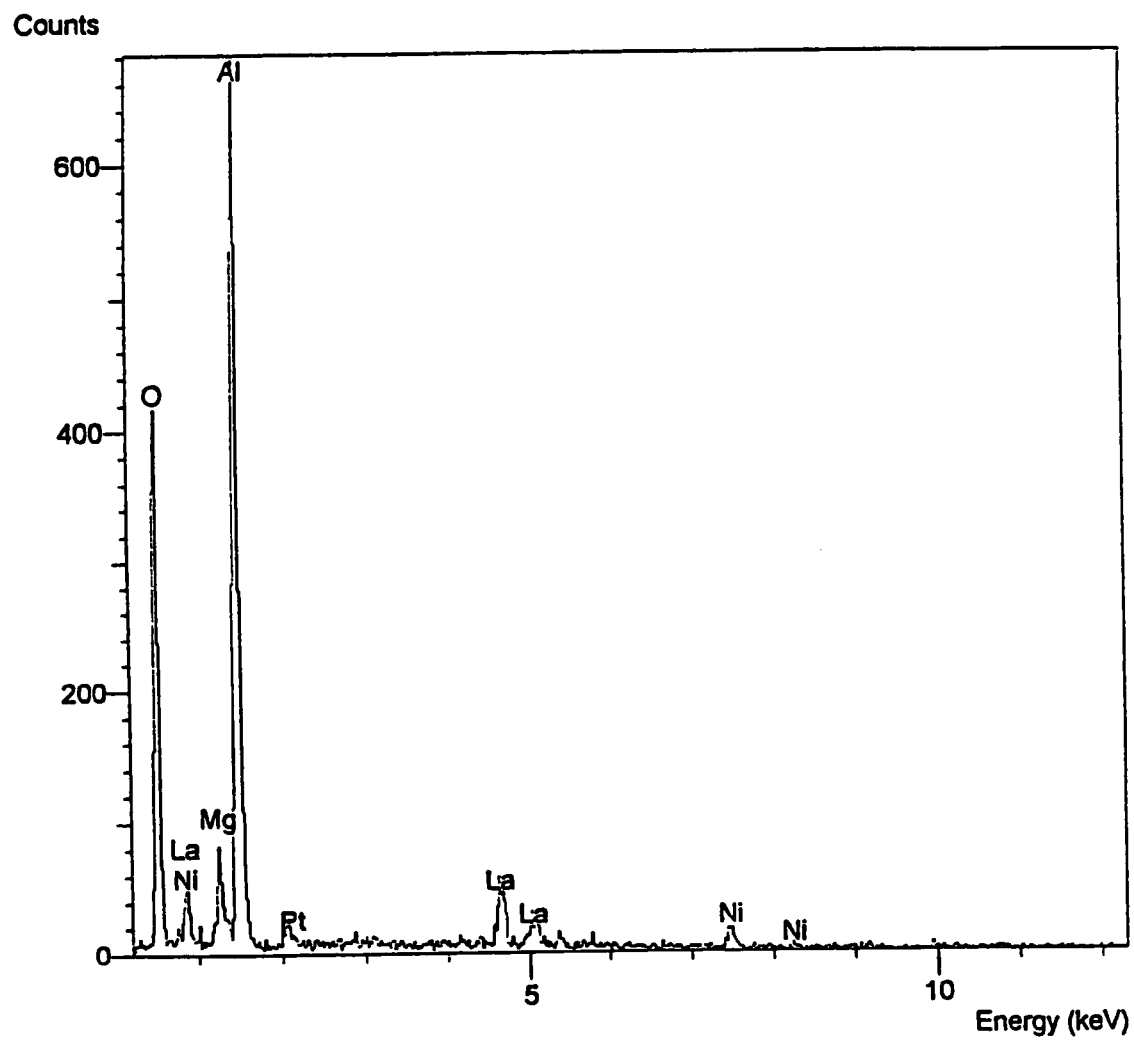
FIG. 5 shows the results of an EDX analysis, which was carried out with an electron scanning microscope and shows results of a corrosion test with $Cr_2O_3$.
Figure 6:
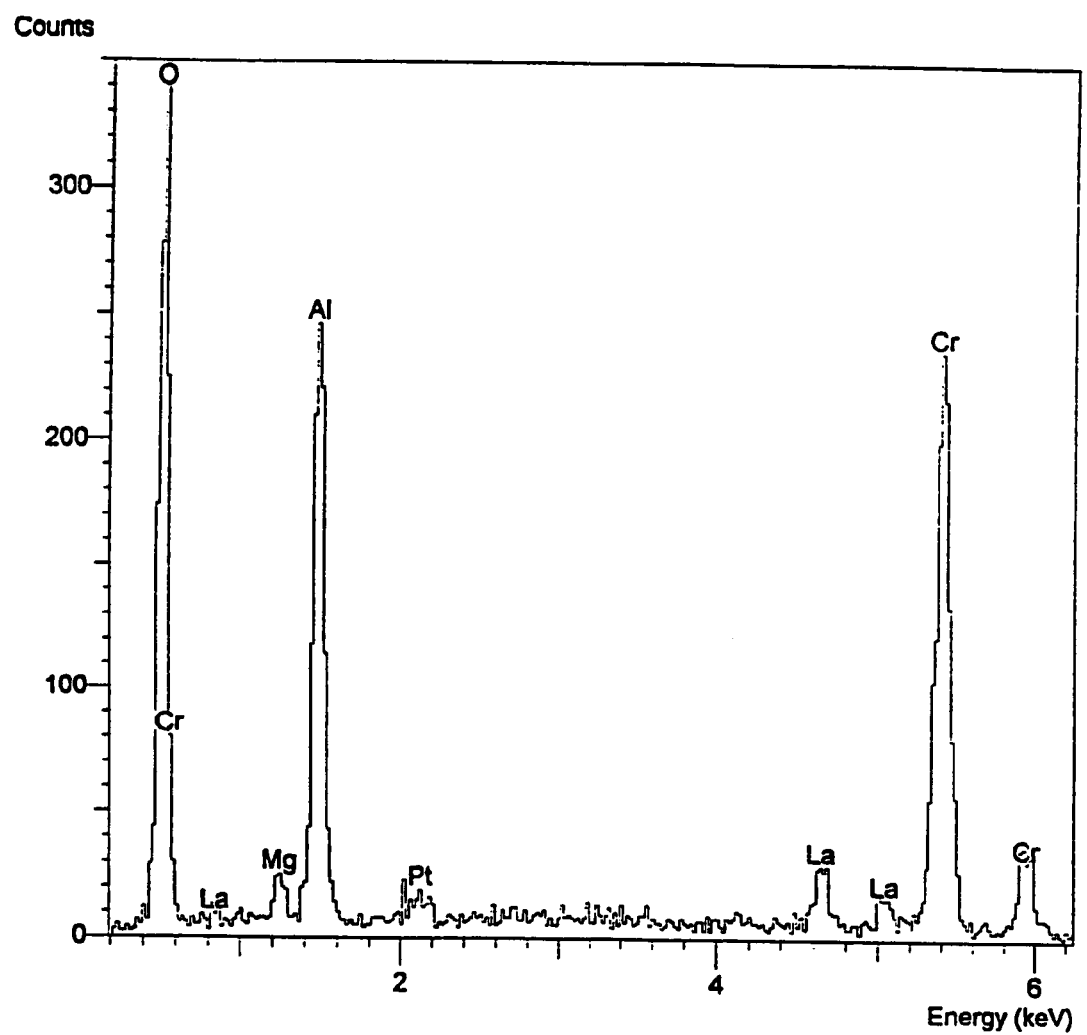
FIG. 6 shows the results of an EDX analysis, which was carried out with an electron scanning microscope and shows results of a corrosion test with NiO.

However, since the two compositions hardly differ in their chemical composition and both crystallise in the same spatial group ($P6_3/mmc$), a discrimination of the chemical composition only on the basis of X-ray powder diffractometry is difficult. Therefore, a separate chemical analysis must be carried out. Two EDX measurements performed in REM are shown in FIGS. 5 and 6, which each show a corrosion test with $Cr_2O_3$ and NiO.

One can clearly see that all of the respective elements can be determined on the basis of their characteristic energy spectrum. The composition of the magnetoplumbite phase composed of Al, Mg, La and O is clearly recognisable. A quantitative evaluation of the EDX values results in the composition of the magnetoplumbite phase. A typical X-ray diffraction measurement of the produced $LaMgAl_{11}O_{19}$ specimen is shown as an example in FIG. 7. A comparison with the JCPDS card (26-0873) according to Table 1 shows complete agreement.

Properties

Figure 4:
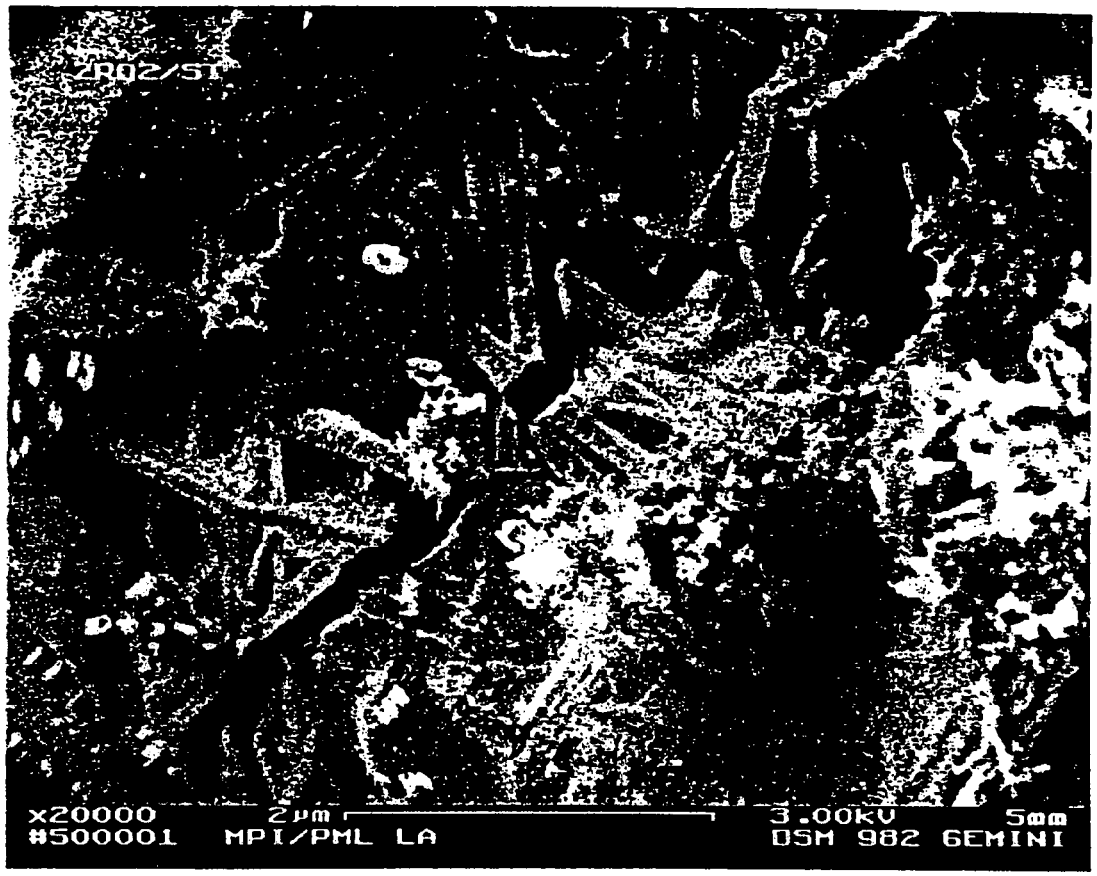
FIG. 4 shows a REM image of a lanthanum magnetoplumbite specimen after tempering at 1570° C. for 10 hours.

The driving force for sintering, also present in these materials, then mainly leads to an enlargement of the grain size or grain coarseness in two dimensions (see FIG. 4). Because of this sintering behaviour, the cover layer does not become more dense as a whole. Rather, an enlargement of individual pores is more likely during the post-sintering process. The porosity of the layer remains unchanged even at temperatures of about 1400° C. (see FIGS. 12 to 15). The functional property of being a heat barrier does not change even after the grain has become more coarse.

Due to the plate-like structure of the material, cavities in the micrometer and submicrometer range are formed, which lead to a very low heat conductivity of the layer ($\lambda_{RT}$=0.8–2.2 [W/mK], $\lambda_{1200}$=1.2–2.6 [W/mk]) in the application temperature range. The thermal expansion coefficient of the thermal insulating material lies between 9.5 and $10.7 \times 10^{-6}$ [$K^{-1}$] in the temperature range between room temperature and 1200° C. and is thus in the same order of magnitude as that for chromium nickel steels.

Also due to this structure, the E modulus of the layer increases during aging, but substantially slower in comparison to the conventional zirconium oxide. To investigate this, one $ZrO_2$ specimen and one $LaMgAl_{11}O_{19}$ specimen were left adjacent to one another in an oven at 1650° C. to 1690° C. for 100 hours in the presence of air. The E modulus of La magnetoplumbite increased during the test by only half of that for zirconium oxide. This quite substantially leads to reduced thermomechanical stress, which in practice arises between the thermal insulating layer and the metallic substrate, since due to the reduced stability crack structures would more likely form in the ceramic thermal insulating layer, and thus a surface peeling of the ceramic layer caused by induced stress is effectively countered. The results of the E modulus measurements in comparison are compiled in Table 3.

A further important advantage of the thermal insulating material of the present invention is that it is inert against the attack of alkali compounds in the atmosphere ($Na_2O$, NaCl, $K_2O$, KCl).

Previous thermal insulating layers based on $ZrO_2$ form low melting point phases with the hydroxides or carbonates of $Na_2O$ and $K_2O$ or through NaCl present in the atmosphere in winter or near the sea, which lead to an enhanced densification of the thermal insulating layer at temperatures under 1000° C. However, with the material according to the present invention, such conditions more likely lead to an increased plate growth, which subsequently makes the increase in density, i.e. the sintering of the cover layer substantially more difficult.

Powder Production a) Mixed Oxide Method

Figure 8:
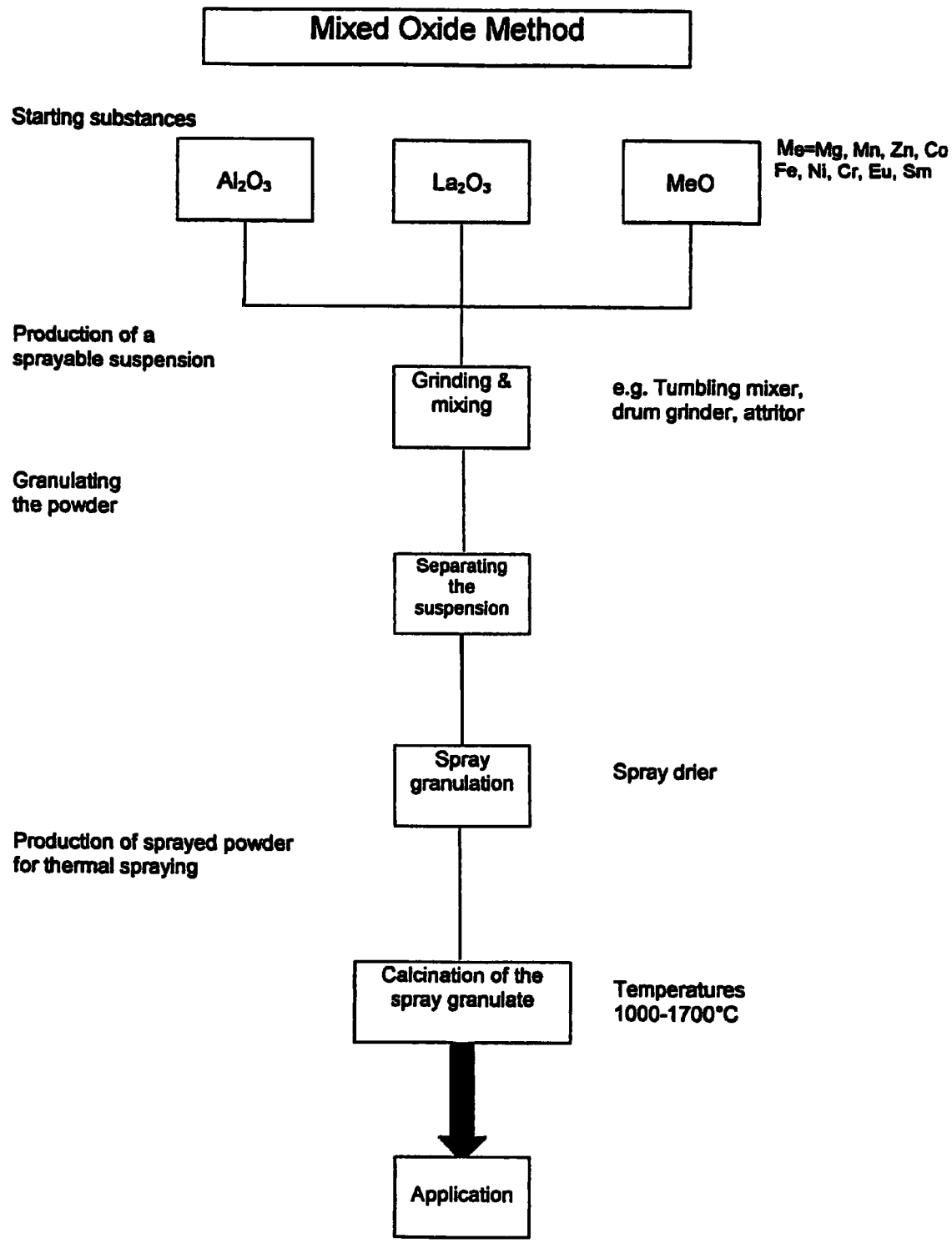
FIG. 8 shows a flow diagram for powder production according to the mixed oxide method.

A first, particularly simple possibility of producing powder is the use of the mixed oxide method, by which the corresponding oxides or salts of the individual compounds as the starting materials are mixed as homogeneously as possible in a drum, swing or tumbling grinder. The mixing process can be carried out in the wet or dry condition (see FIG. 8). Aluminum oxide or zirconium oxide grains are preferably used in both cases as the grinding bodies. Subsequently, the powder is granulated. When mixed in a liquid medium, preferably water, the resulting suspension is then evaporated in a spray drier. Subsequently, the powder is preferably annealed in air at temperatures between 500° C. and 1800° C. for about 1 to 20 hours to form single-phase, oxidic agglomerates with an average diameter of 1–200 µm and a specific surface area between 0.1 and 40 $m^2/g$.

The powder produced under dry conditions remains multiphased even after the mixing process. This multiphase oxide mixture is preferably initially treated with binders, before the granulation, preferably by spray drying, and the subsequent annealing treatment. The annealing takes place in air above 500° C. up to about 1600° C. for about 0.5 to 20 hours, whereby a homogeneous oxidic powder is formed. In this case, granulates are also formed with an average diameter of between 1–200 µm and a specific surface area of between 0.1 and 40 $m^2/g$.

b) Coating an Insoluble Carrier Powder

Figure 9:
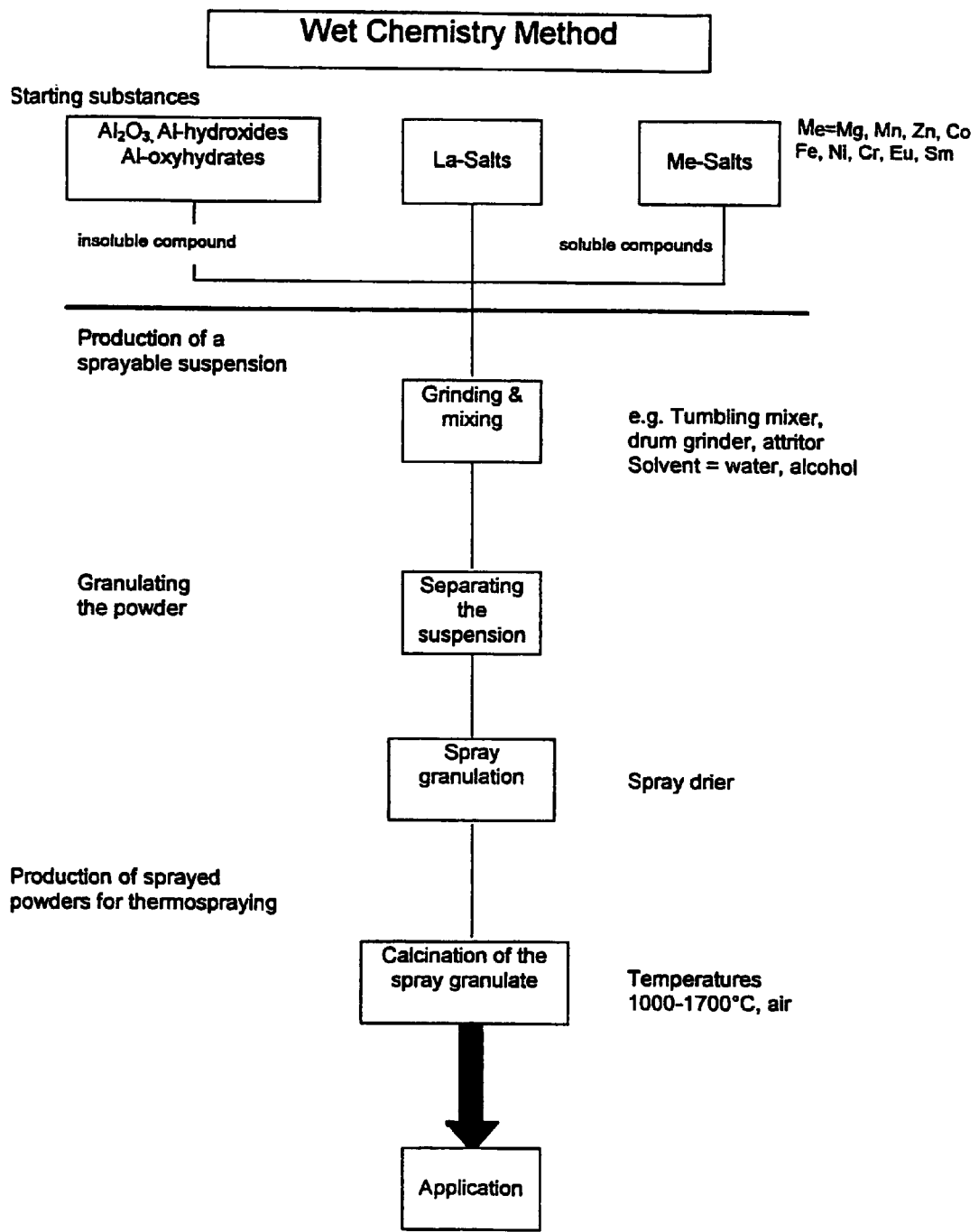
FIG. 9 shows a flow diagram for powder production according to the wet chemistry method.

The powder can also be produced in an a wet chemical process from oxides, hydroxides, acetates, carbonates, hydrogen carbonates or another salt as the starting compound (see FIG. 9). Initially, an insoluble carrier powder is coated.

One preferably works in an aqueous medium. Preferably an insoluble oxide, a hydroxide or an oxy-hydrate of Al is used as the starting material. The other components are added as water soluble salts, preferably carbonates, hydrogen carbonates or acetates. Following a grinding and dispersion step, the resulting suspension is dried, preferably in a spray drying process and the powder is subsequently subjected to an annealing treatment. The powder is annealed at temperatures of 500° C. to 1800° C. in the presence of air for a duration of 1 to 20 hours to form single-phase, oxidic agglomerates having an average diameter of between 1–200 $\mu$m and a specific surface area of between 0.1 and 40 m$^2$/g.

As an alternative medium, alcoholic solutions such as methanol, ethanol or isopropanol can also be used.

c) Production from Alcoholates (Sol-gel Process)

In contrast to the above two variations, this route has the advantage that the produced powder is extremely homogeneous in its composition and has very fine grains.

Figure 10:
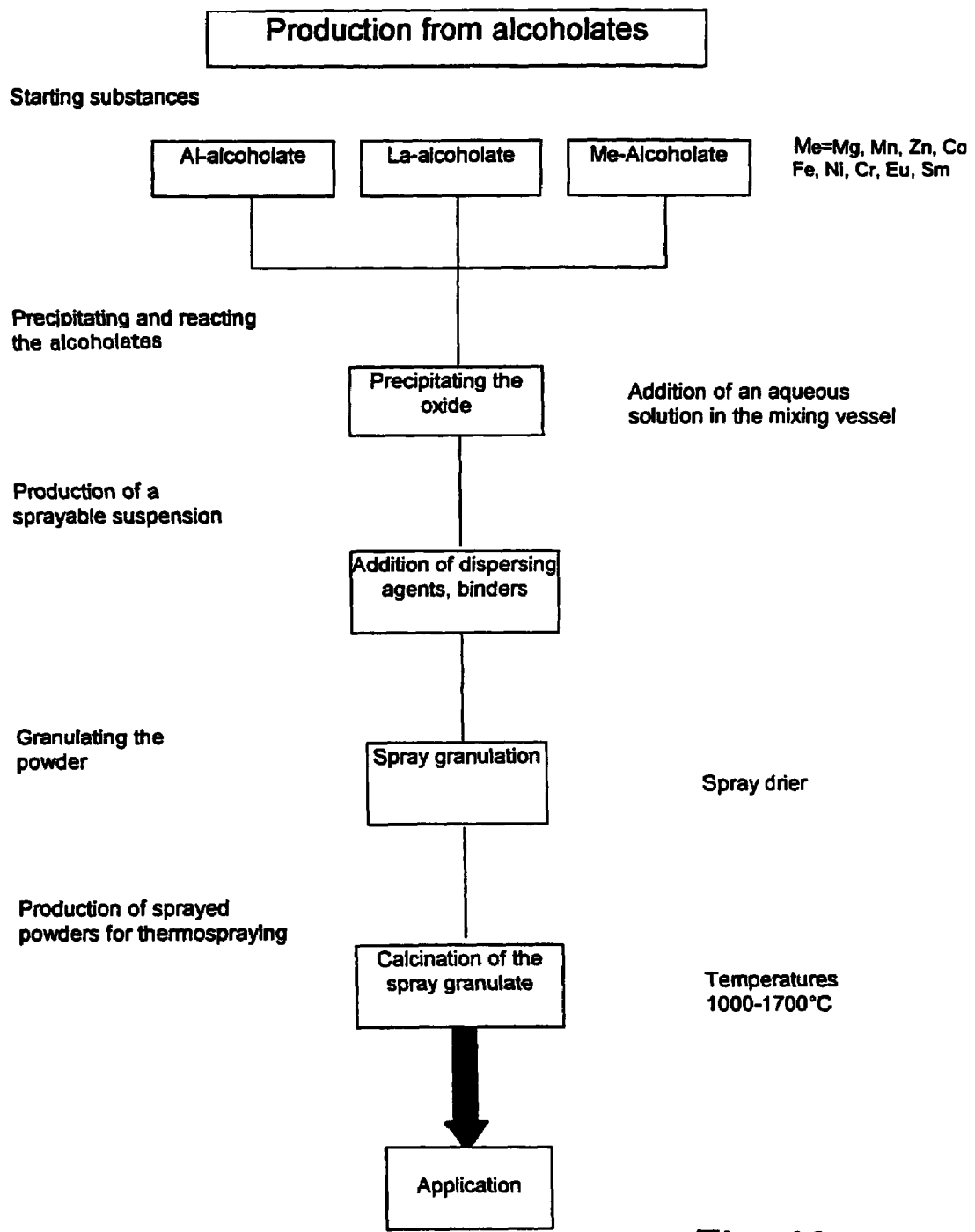
FIG. 10 shows a flow diagram for powder production from alcoholates via a sol-gel process.

For the production, one expediently uses aluminum alcoholates and lanthanum or neodymium and Me alcoholates (Mg alcoholates), i.e. compounds which are already liquid or are soluble in alcohol and/or water (see FIG. 10). By adding water to the alcohol solvent or by modifying the pH value of an aqueous solution, the compounds are precipitated and form very fine grain and very homogeneous mixtures together. These are then separated from the solution and dried. After the drying step, which can be carried out at temperatures in the range of about 500° C. to 1700° C., preferably in the range of about 1000° C., very fine grained oxidic mixtures are formed.

According to a variation of the method, it is possible to add dispersing agents or binders after precipitation of the oxide to produce a sprayable suspension as illustrated in FIG. 10. Subsequently, the granulation of the powder follows, preferably in a spray drier, and following this a calcination of the sprayed granulate at temperatures preferably in the range of about 1000° C. to 1700° C. After separating the precipitated oxide or hydroxide from the remaining solution and the optional addition of dispersing agents or binders, one obtains a mass with about 60 to 70% solids content, which can be readily spray dried.

For the alcoholates, one mainly uses compounds of the form —OC$_n$H$_{2n+1}$, whereby the abbreviation OC$_n$H$_{2n+1}$ stands for methoxy, ethoxy, isopropoxy, propoxy, butoxy and isobutoxy (with n=1 to 5), or water soluble salts of lanthanum and magnesium (acetates, citrates, carbonates, hydrogen carbonates, formates, hydroxides, nitrates or other water or alcohol soluble salts) are added to a solution of aluminum alcoholate and are simultaneously precipitated, usually with the addition of water.

d) Production of Highly Crystallisable Powder

During the mixing and drying as described above, the powder is additionally doped with a different phase insoluble in the "hexa-aluminate" phase by adding a second component. This results in a preferred crystallisation of the aluminate during plasma spraying, increased adhesion and better thermal shock resistance.

These additives can include the following:

ZrO$_2$ as monoclinic, tetragonal or cubic form (the latter two phases each doped with MgO, CaO or Y$_2$O$_3$, respectively), La$_2$Zr$_2$O$_7$, MgZrO$_3$, Nd$_2$O$_3$, HfO$_2$, Y$_2$O$_3$, Yb$_2$O$_3$, Eu$_2$O$_3$, La$_2$Hf$_2$O$_7$ MgHfO$_3$, salts of alkali oxides (Na$_2$O, K$_2$O, Li$_2$O).

The salts consist of carbonates, hydroxides, chlorides, nitrates, acetates, formates, citrates, sulphates, hydrogen carbonates or mixed salts of the above-mentioned salts. Alloys or mixtures of these substances are also possible. The amount of doping can lie between 0.001 to 20 wt.-%, preferably 0.1 to 3 wt.-%.

Figure 11:
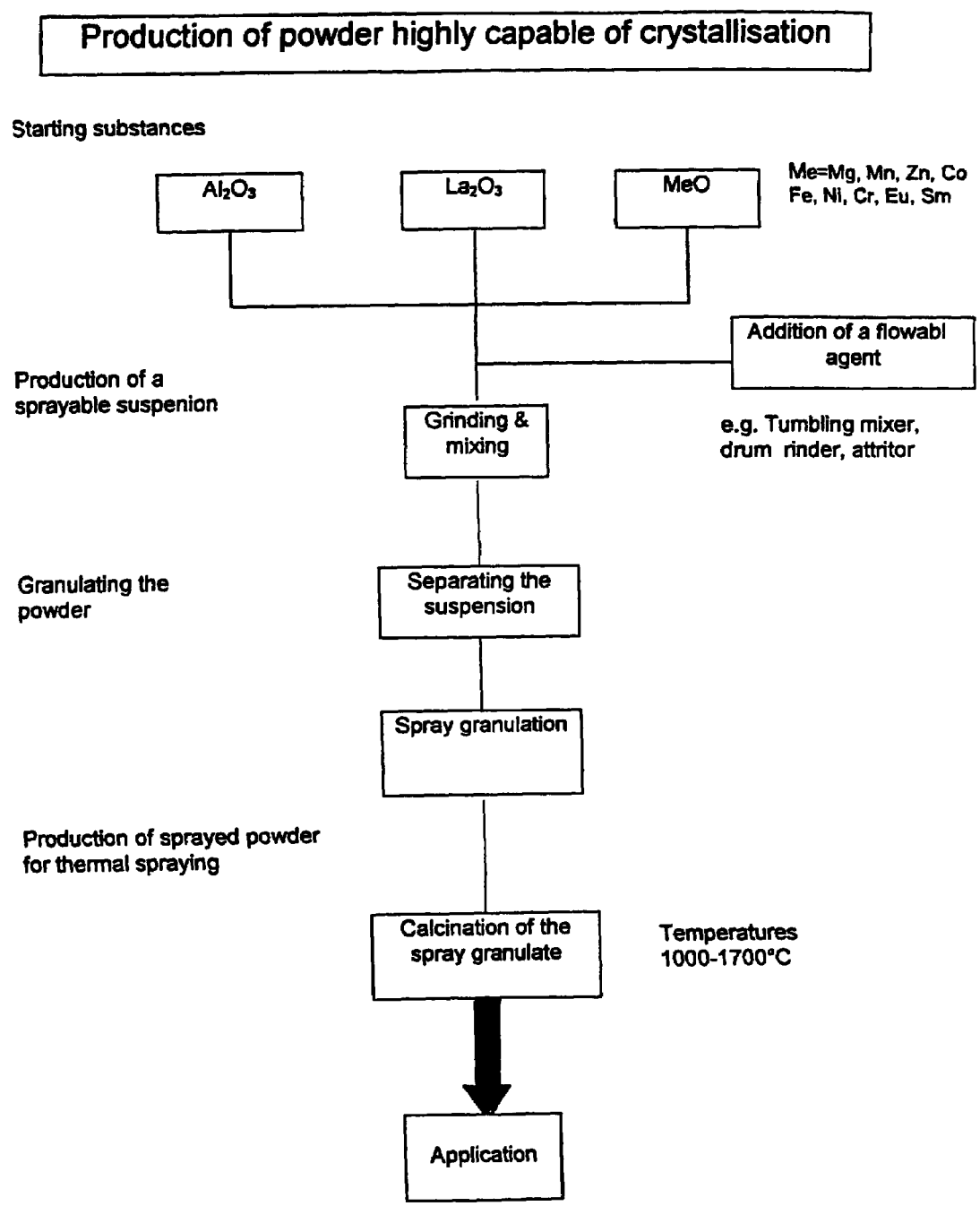
FIG. 11 shows a flow diagram of production variations, by which the first component is additionally doped with a second component to produce a powder highly capable of crystallisation.
Figure 12:
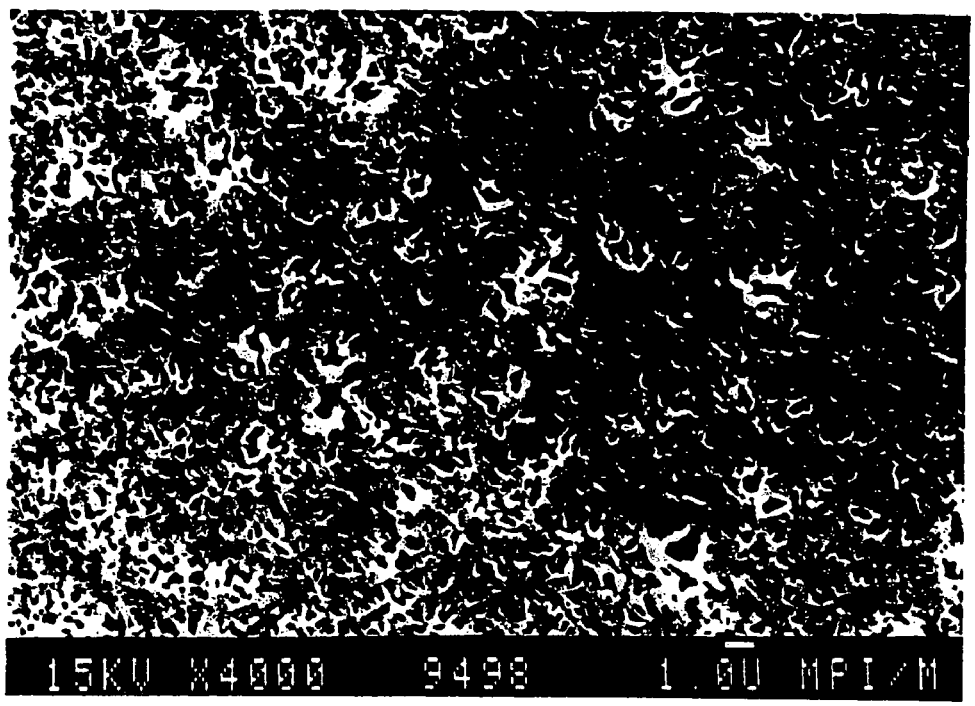
FIGS. 12–15 show REM images of a specimen of a powder made in the wet method generated by sintering.
Figure 13:
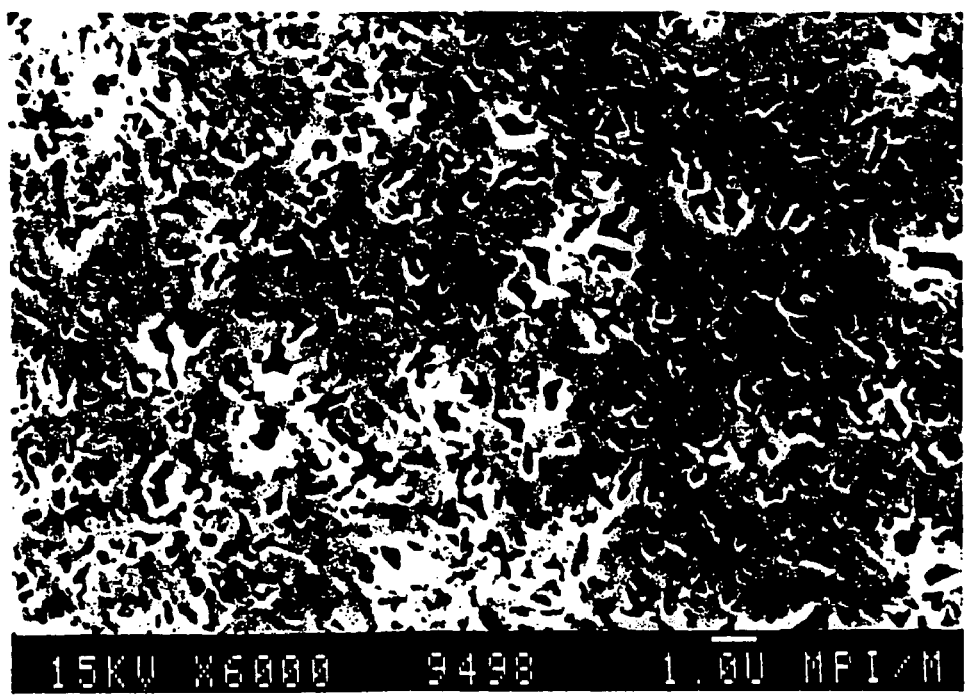
Figure 14:
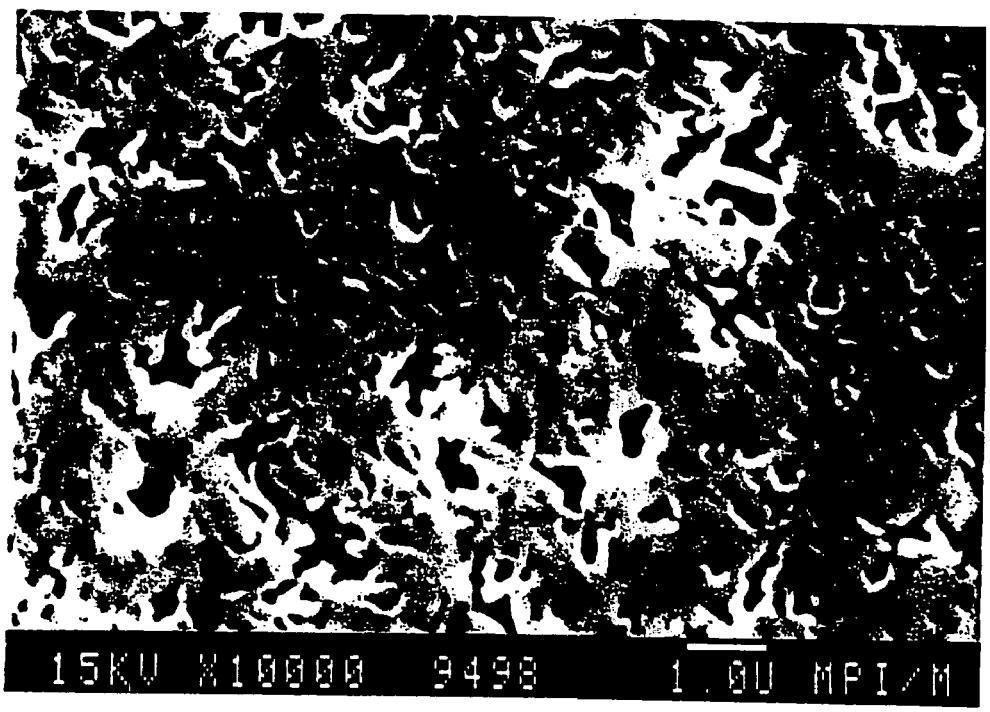
Figure 15:
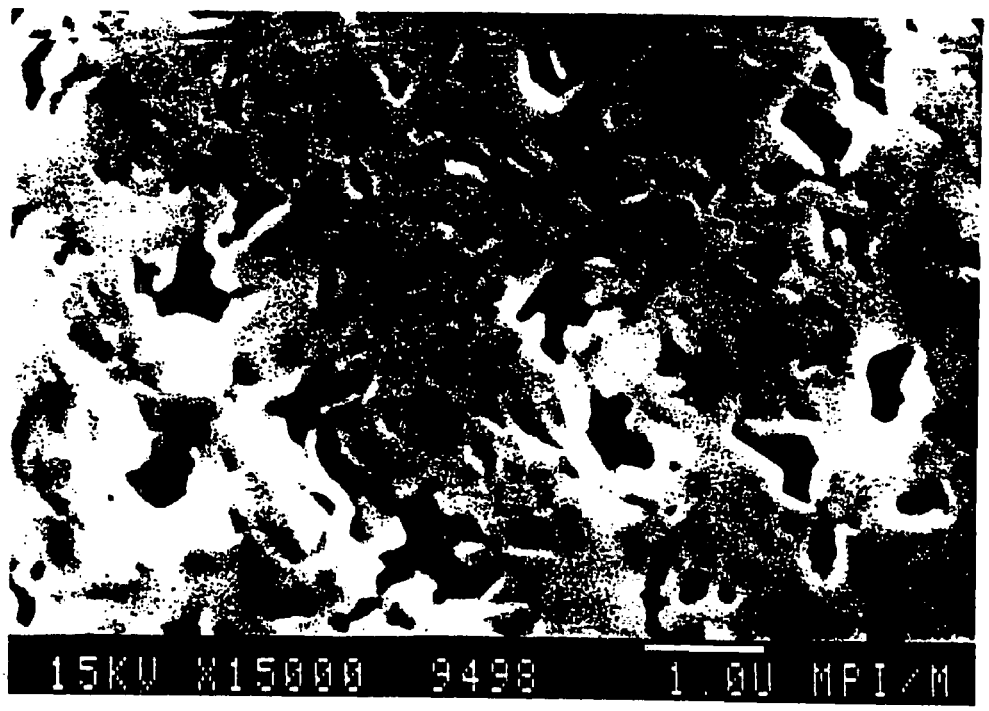

The addition takes place either as a further oxidic powder in the wet chemical or in the mixed oxide method according to FIG. 11 or in the form of soluble components in the sol-gel method which are subsequently precipitated during the powder production.

In the sol-gel route, the salt is also added and precipitated during the powder production or it is added with the binder and dispersing agents, and this mixture is then spray dried.

Processing of the Produced Powder

The preferred use of the thermal insulating material is the preparation of thermal insulating layers on highly thermally loaded metal parts, for example high alloy chromium nickel steels. The main area of application is for gas turbines in aeroplanes or turbines in thermoelectric power plants as well as thermally loaded components in motors. Movable and non-movable parts can be coated. Higher degrees of efficiency are achieved with these layers, because higher operational temperatures are possible. The wear on the machines caused by high temperatures is greatly reduced.

Preferably, the coatings are applied by plasma spraying the powder whereby the addition of the second component is preferred as mentioned. The resulting ability to crystallize during the rapid cooling by thermal spraying is improved, especially at the transition surface to the metal layer. In addition, the adhesive properties are improved as well as the thermal shock resistance.

Furthermore, high temperature resistance, thermal insulating massive parts can be produced from the powder, also with powder technology methods. The normal powder moulding methods are available, for example cold pressing or isostatic cold pressing, slip casting and the like, after which the sintering process follows in a resistance oven or a gas fired oven, optionally in the presence of a slightly reducing atmosphere, at temperatures in the range of above 1600° C.

Alternatively, ceramic foams can be produced. A polymer foam is filled with slip and the solvent is driven off at temperatures of about 200° C. to 300° C. This is followed by heating to about 1000° C. and then a final heat treatment at about 1400° C. to 1700° C.

Alternatively, a suspension can be foamed into a low viscosity polymer with a foaming gas (for example polyurethane with foaming gas/hardening agent). Subsequently, the polymers are driven off at temperatures of about 1000° C. and finally the heat treatment is carried out at about 1400° C. to 1700° C.

TABLE 1

| 26–873 | JCPDS-ICDD Copyright (c) 1996 | PDF-2 Sets 1–46 database | Quality: i |
|---|---|---|---|

| | d Å | Int. | h | k | l |
|---|---|---|---|---|---|
| MgAl$_{11}$LaO$_{19}$ | 4.7 | 55 | 1 | 0 | 1 |
| | 4.42 | 40 | 1 | 0 | 2 |
| Magnesium Aluminum Lanthanum Oxide | 4.03 | 20 | 1 | 0 | 3 |
| | 3.66 | 20 | 0 | 0 | 6 |
| | 3.63 | 15 | 1 | 0 | 4 |
| Rad: Cu  Lambda: 1.54056  Filter: Ni  d-sp: | 3.25 | 15 | 1 | 0 | 5 |
| Cutoff:  Int: Diffractometer  I/Icor: | 2.79 | 70 | 1 | 1 | 0 |
| Ref: Verstegen, Philips, Bindhoven, Netherlands, Private Communication | 2.74 | 15 | 0 | 0 | 8 |
| | 2.705 | 30 | 1 | 1 | 2 |
| | 2.630 | 85 | 1 | 0 | 7 |
| Sys: Hexagonal  S.G.: P63/nmc (194) | 2.485 | 100 | 1 | 1 | 4 |
| a: 5.582  b:  c: 21.942  A:  C: 3.9308 | 2.420 | 30 | 2 | 0 | 0 |
| A:  B:  C:  Z: 2  np: | 2.295 | 50 | 2 | 0 | 3 |
| Ref: Ibid. | 2.210 | 10 | 2 | 0 | 4 |
| Dx: 4.285  Dm:  SS/POM: P30 = 16(.041,47) | 2.190 | 20 | 0 | 0 | 10 |
| ea:  nvB:  ey:  Sign:  2V: | 2.180 | 15 | 1 | 0 | 9 |
| Ref: | 2.115 | 65 | 2 | 0 | 5 |
| | 2.015 | 45 | 2 | 0 | 6 |
| | 2.000 | 10 | 1 | 0 | 10 |
| | 1.950 | 5 | 1 | 1 | 8 |
| Color: White | 1.842 | 10 | 1 | 0 | 11 |
| Sample V 789-2 fired from the oxides at 900 C. and 1550 C.. Magnetoplumbite | 1.820 | 5 | 2 | 1 | 1 |
| type. PSC: hP64. Nwt: 764.00. Volume[CD]: 592.09. | 1.773 | 5 | 2 | 1 | 3 |
| | 1.732 | 10 | 2 | 1 | 4 |
| | 1.725 | 10 | 1 | 1 | 10 |

| d Å | Int. | h | k | l | d Å | Int. | h | k | l | d Å | Int. | h | k | l |
|---|---|---|---|---|---|---|---|---|---|---|---|---|---|---|
| 1.717 | 10 | 2 | 0 | 9 | 1.579 | 40 | 2 | 1 | 7 | | | | | |
| 1.685 | 5 | 2 | 1 | 5 | 1.575 | 20 | 3 | 0 | 3 | | | | | |
| 1.613 | 10 | 3 | 0 | 0 | 1.545 | 30 | 3 | 0 | 4 | | | | | |
| 1.595 | 20 | 3 | 0 | 2 | 1.531 | 30 | 2 | 0 | 11 | | | | | |
| 1.590 | 5 | 1 | 0 | 13 | | | | | | | | | | |

Strong lines: 2.49/X 2.63/9 2.79/7 2.12/7 4.70/6 2.30/5 2.02/5 4.42/4

TABLE 2

| 33–699 | JCPDS-ICDD Copyright (c) 1996 | PDF-2 Sets 1–46 database | Quality: * |
|---|---|---|---|

| | d Å | Int. | h | k | l |
|---|---|---|---|---|---|
| LaAl$_{11}$O$_{18}$ | 11.02 | 16 | 0 | 0 | 2 |
| | 5.51 | 6 | 0 | 0 | 4 |
| Lanthanum Aluminum Oxide | 4.81 | 4 | 0 | 1 | 0 |
| | 4.71 | 30 | 0 | 1 | 1 |
| | 4.41 | 30 | 0 | 1 | 2 |
| Rad: CuKa  Lambda: 1.5418  Filter: Ni  d-sp: Diff. | 4.03 | 10 | 0 | 1 | 3 |
| Cutoff:  Int: Diffractometer  I/Icor; | 3.67 | 20 | 0 | 0 | 6 |
| Ref: Ropp, R., Libowitz, J. Am. Ceram. Soc., 61 473 (1978) | 3.63 | 11 | 0 | 1 | 4 |
| | 3.25 | 5 | 0 | 1 | 5 |
| | 2.781 | 45 | 1 | 1 | 0 |
| Sys: Hexagonal  S.G.: P63/mac (194) | 2.755 | 15 | 0 | 0 | 8 |
| a: 5.561(7)  b:  c: 22.041(4)  A:  C: 3.9635 | 2.696 | 15 | 1 | 1 | 2 |
| A:  B:  C:  Z:  np: *2000 deg. | 2.635 | 100 | 0 | 1 | 7 |
| Ret: Ibid. | 2.482 | 75 | 1 | 1 | 4 |
| Dx:  Dm:  SS/POM: P30 = 76(.007,54) | 2.408 | 6 | 0 | 2 | 0 |
| ea:  nvB:  ey:  Sign:  2V: | 2.391 | 1 | 0 | 1 | 8 |
| Ref: | 2.352 | 1 | 0 | 2 | 2 |
| | 2.288 | 25 | 0 | 2 | 3 |
| Made by heating La2O3 and Al2O3 together at 1450 deg. for >130 days or at | 2.113 | 65 | 0 | 2 | 5 |
| 1650 deg. for 96 hours. The data was deposited with J. Am. Ceram. Soc., | 2.014 | 45 | 0 | 2 | 6 |
| (ACSD146). KBr used as internal standard. PSC: hP?. Plus 7 reflections to | 1.850 | 8 | 0 | 1 | 11 |
| 0.96. Mvt: 723.69. Volume[CD]: 590.29. | 1.814 | 4 | 1 | 2 | 1 |
| | 1.728 | 5 | 1 | 2 | 4 |

| d Å | Int. | h | k | l | d Å | Int. | h | k | l | d Å | Int. | h | k | l |
|---|---|---|---|---|---|---|---|---|---|---|---|---|---|---|
| 1.717 | 15 | 0 | 2 | 9 | 1.3902 | 50 | 2 | 2 | 0 | 1.1867 | 6 | 0 | 1 | 18 |
| 1.605 | 5 | 0 | 3 | 0 | 1.3177 | 18 | 0 | 2 | 14 | 1.1615 | 5 | 0 | 4 | 5 |
| 1.576 | 35 | 1 | 2 | 7 | 1.2976 | 4 | 0 | 3 | 10 | 1.1433 | 4 | 1 | 2 | 15 |

TABLE 2-continued

| 1.5402 | 60 | 0 | 2 | 11 | 1.2406 | 6 | 1 | 2 | 13 | 1.1415 | 4 | 0 | 2 | 17 |
|---|---|---|---|---|---|---|---|---|---|---|---|---|---|---|
| 1.5187 | 4 | 1 | 2 | 8 | 1.2296 | 9 | 1 | 3 | 7 | | | | | |

Strong lines: 2.64/X 2.48/8 2.11/7 1.54/6 1.39/5 2.78/5 2.01/5 1.58/4

Comparison of the E modulus of $ZrO_2$ and $LaMgAl_{11}O_{19}$ after storage at 1670° C. for 100 hours in the presence of air

TABLE 3

| Material | E modulus |
|---|---|
| tetragonal $ZrO_2$ specimen | 242 GPa |
| $LaMgAl_{11}O_{19}$ specimen | 127 GPa |

The invention claimed is:

1. A method of producing a powder-like thermal insulating material comprising a first component with at least one first phase, which stoichiometrically contains (a) 1 to 80 mol-% of $M_2O_3$, (b) 0.5 to 80 mol-% MeO and (c) the remainder comprising $Al_2O_3$, wherein M is selected from the group formed by lanthanum, neodymium and mixtures thereof, and Me is selected from the group formed by zinc, the alkaline earth metals, transition metals, the rare earths and mixtures thereof, said method comprising the steps of:
   (a) adding a starting material, in a quantity appropriate to yield the stoichiometry of said insulating material, selected from the group consisting of oxides of Al, hydroxides of Al, oxy-hydrates of Al, and mixtures thereof, to a solvent in which said starting material is insoluble, selected from the group consisting of aqueous solvents, alcoholic solvents and mixtures thereof;
   (b) adding salts of $M_2O_3$ and MeO which are soluble in said solvent, in quantities appropriate to yield the stoichiometry of said insulating material, to said solvent;
   (c) dispersing said starting material and said salts to form a suspension;
   (d) drying said suspension to form a dry material; and
   (e) annealing said dry material.

2. A method according to claim 1, further comprising the step of grinding and dispersing said dry material before said annealing step.

3. A method according to claim 2, wherein said drying step comprises spray drying said material after said grinding and dispersing step but before said annealing step.

4. A method according to claim 1, wherein said solvent is selected from the group consisting of methanol, ethanol, isopropanol, and mixtures thereof.

5. A method according to claim 1, wherein said salts are selected from the group consisting of carbonates, hydrogen carbonates, acetates, and mixtures thereof.

6. A method according to claim 1, wherein said annealing step is performed for from about 0.5 to about 20 hours at a temperature of from about 500° C. to about 1800° C.

7. A method according to claim 1, wherein at least one compound selected from the group consisting of $ZrO_2$, $La_2Zr_2O_7$, $MgZrO_3$, $Nd_2O_3$, $HfO_2$, $Y_2O_3$, $Yb_2O_3$, $Eu_2O_3$, $La_2Hf_2O_7$, $MgHfO_3$, oxides of the alkali metals, salts of alkali metals, and mixtures and alloys thereof, is added to said solvent prior to said drying step.

8. A thermal insulating material made according to a process comprising producing a powder-like thermal insulating material comprising a first component with at least one first phase forming a magnetoplumbite structure, which stoichiometrically contains (a) 1 to 80 mol-% of $M_2O_3$, (b) 0.5 to 80 mol-% MeO and (c) the remainder comprising $Al_2O_3$, wherein M is selected from the group formed by lanthanum, neodymium and mixtures thereof, and Me is selected from the group formed by zinc, the alkaline earth metals, transition metals, the rare earth metals and mixtures thereof, said method comprising the steps of:
   (a) adding a starting material, in a quantity appropriate to yield the stoichiometry of said insulating material, selected from the group consisting of oxides of Al, hydroxides of Al, oxy-hydrates of Al, and mixtures thereof, to a solvent in which said starting material is insoluble, selected from the group consisting of aqueous solvents, alcoholic solvents and mixtures thereof;
   (b) adding salts of $M_2O_3$ and MeO which are soluble in said solvent, in quantities appropriate to yield the stoichiometry of said insulating material, to said solvent;
   (c) dispersing said starting material and said salts to form a suspension;
   (d) drying said suspension to form a dry material; and
   (e) annealing said dry material.

9. A thermal insulating material according to claim 8, comprising granulates having an average diameter of from about 1 to about 200 µm and a specific surface area of from about 0.1 and about 40 $m^2/g$.

10. A thermal insulating material of claim 8, wherein Me is selected from the group formed by magnesium, zinc, cobalt, manganese, iron, nickel, chromium, europium, samarium and mixtures thereof.

11. A thermal insulating material of claim 8, wherein the first component contains 1 to 50 mol-% of $M_2O_3$ and 1 to 50 mol-% MeO.

12. A thermal insulating material of claim 11, wherein the first component contains about 5 to 10 mol-% of $M_2O_3$ and about 10 to 20 mol-% MeO.

13. A thermal insulating material of claim 8, additionally comprising 0.001 to 20 wt.-% of a second component insoluble in the first component as a crystallisation aid for forming a hexa-aluminate phase.

14. A thermal insulating material of claim 8, wherein said insulating material follows the formula $M_2O_3$-xMeO-y$Al_2O_3$, wherein M is selected from the group consisting of lanthanum and neodymium, $0.2 \leq x \leq 3.3$, and $10.0 \leq y \leq 13$.

15. A method of producing a powder-like thermal insulating material comprising a first component with at least one first phase, which stoichiometrically contains (a) 1 to 80 mol-% of $M_2O_3$, (b) 0.5 to 80 mol-% MeO and (c) the remainder comprising $Al_2O_3$, wherein M is selected from the group formed by lanthanum, neodymium and mixtures thereof, and Me is selected from the group formed by zinc, the alkaline earth metals, transition metals, the rare earths and mixtures thereof, said method comprising the steps of:
   (a) mixing starting materials selected from the group consisting of oxides and salts of M, Me and Al, in quantities appropriate to yield the stoichiometry of said insulating material;
   (b) granulating said mixture; and
   (c) annealing said mixture.

16. A method according to claim 15, wherein said mixing is performed in a drum grinder or a tumbling grinder employing grinding bodies selected from the group consisting of $Al_2O_3$, $ZrO_2$, and mixtures thereof.

17. A method according to claim 15, wherein said mixing is performed in a liquid medium and wherein said method additionally comprises a step of drying said mixture prior to said annealing step.

18. A method according to claim 15, wherein said materials are mixed with binders during said mixing step.

19. A method according to claim 15, wherein said annealing step is performed for from about 0.5 to about 20 hours at a temperature of from about 300° C. to about 1800° C.

20. A method according to claim 15, wherein at least one compound selected from the group consisting of $ZrO_2$, $La_2Zr_2O_7$, $MgZrO_3$, $Nd_2O_3$, $HfO_2$, $Y_2O_3$, $Yb_2O_3$, $Eu_2O_3$, $La_2Hf_2O_7$, $MgHfO_3$, oxides of the alkali metals, salts of alkali metals, and mixtures and alloys thereof, is added to said mixture prior to said annealing step.

21. A thermal insulating material made according to a process comprising producing a powder-like thermal insulating material comprising a first component with at least one first phase forming a magnetoplumbite structure, which stoichiometrically contains (a) 1 to 80 mol-% of $M_2O_3$, (b) 0.5 to 80 mol-% MeO and (c) the remainder comprising $Al_2O_3$, wherein M is selected from the group formed by lanthanum, neodymium and mixtures thereof, and Me is selected from the group formed by zinc, the alkaline earth metals, transition metals, the rare earth metals and mixtures thereof, said method comprising the steps of:
(a) mixing starting materials selected from the group consisting of oxides and salts of M, Me and Al, in quantities appropriate to yield the stoichiometry of said insulating material;
(b) granulating said mixture; and
(c) annealing said mixture.

22. A thermal insulating material according to claim 21, comprising granulates having an average diameter of from about 1 to about 200 μm and a specific surface area of from about 0.1 and about 40 $m^2/g$.

23. A thermal insulating material of claim 21, wherein Me is selected from the group formed by magnesium, zinc, cobalt, manganese, iron, nickel, chromium, europium, samarium and mixtures thereof.

24. A thermal insulating material of claim 21, wherein the first component contains 1 to 50 mol-% of $M_2O_3$ and 1 to 50 mol-% MeO.

25. A thermal insulating material of claim 24, wherein the first component contains about 5 to 10 mol-% of $M_2O_3$ and about 10 to 20 mol-% MeO.

26. A thermal insulating material of claim 21, additionally comprising 0.001 to 20 wt.-% of a second component insoluble in the first component as a crystallisation aid for forming a hexa-aluminate phase.

27. A thermal insulating material of claim 21, wherein said insulating material follows the formula $M_2O_3$-xMeO-y$Al_2O_3$, wherein M is selected from the group consisting of lanthanum and neodymium, $0.2 \leq x \leq 3.3$, and $10.0 \leq y \leq 13$.

28. A method of producing a powder-like thermal insulating material comprising a first component with at least one first phase, which stoichiometrically contains (a) 1 to 80 mol-% of $M_2O_3$, (b) 0.5 to 80 mol-% MeO and (c) the remainder comprising $Al_2O_3$, wherein M is selected from the group formed by lanthanum, neodymium and mixtures thereof, and Me is selected from the group formed by zinc, the alkaline earth metals, transition metals, the rare earths and mixtures thereof, wherein Me is not manganese, said method comprising the steps of:
(a) mixing starting materials selected from the group consisting of salts of M and Me soluble in water and/or alcohol, with an aluminum alcoholate, in quantities appropriate to yield the stoichiometry of said insulating material, to form a solution;
(c) precipitating and separating solid materials from said solution;
(d) drying said solid materials to form a dry material; and
(e) annealing said dry material.

29. A method according to claim 28, wherein said precipitating step comprises the addition of water to said solution.

30. A method according to claim 28, wherein said precipitating step comprises adjusting the pH of said solution.

31. A method according to claim 28, wherein said annealing step is performed at a temperature of from about 500° C. to about 1700° C.

32. A method according to claim 28, wherein said starting materials are alcoholates of the formula $-OC_nH_{2n+1}$, where $1 \leq n \leq 5$.

33. A method according to claim 32, wherein said alcoholates are selected from the group consisting of methoxy, ethoxy, isopropoxy, propoxy, butoxy, and isobutoxy alcoholates, and mixtures thereof.

34. A method according to claim 28, wherein said starting materials are water soluble salts, selected from the group consisting of acetates, citrates, carbonates, hydrogen carbonates, formates, hydroxides, and nitrates.

35. A process according to claim 28, additionally comprising the step of mixing an organic binding agent with said solid materials after said precipitating and separating step and before said drying step.

36. A process according to claim 28, wherein said drying step comprises spray drying.

37. A method according to claim 28, wherein at least one compound selected from the group consisting of $ZrO_2$, $La_2Zr_2O_7$, $MgZrO_3$, $Nd_2O_3$, $HfO_2$, $Y_2O_3$, $Yb_2O_3$, $Eu_2O_3$, $La_2Hf_2O_7$, $MgHfO_3$, oxides of the alkali metals, salts of the alkali metals, and mixtures and alloys thereof, is added to said solvent prior to said precipitating and separating step.

38. A thermal insulating material made according to the process of claim 28.

39. A thermal insulating material of claim 38, wherein Me is selected from the group formed by magnesium, zinc, cobalt, iron, nickel, chromium, europium, samarium and mixtures thereof.

40. A thermal insulating material of claim 38, wherein the first component contains 1 to 50 mol-% of $M_2O_3$ and 1 to 50 mol-% MeO.

41. A thermal insulating material of claim 40, wherein the first component contains about 5 to 10 mol-% of $M_2O_3$ and about 10 to 20 mol-% MeO.

42. A thermal insulating material of claim 38, additionally comprising 0.001 to 20 wt.-% of a second component insoluble in the first component as a crystallisation aid for forming a hexa-aluminate phase.

43. A thermal insulating material of claim 38, wherein said insulating material follows the formula $M_2O_3$-xMeO-y$Al_2O_3$, wherein M is selected from the group consisting of lanthanum and neodymium, $0.2 \leq x \leq 3.3$, and $10.0 \leq y \leq 13$.

44. A method of making a thermal insulating part, comprising
(a) forming said part from a thermal insulating material comprising a first component with at least one first phase, which stoichiometrically contains (a) 1 to 80 mol-% of $M_2O_3$, (b) 0.5 to 80 mol-% MeO and (c) the remainder comprising $Al_2O_3$, wherein M is selected from the group formed by lanthanum, neodymium and mixtures thereof, and Me is selected from the group formed by zinc, the alkaline earth metals, transition metals, the rare earths and mixtures thereof; and (b) sintering said part.

45. A method according to claim 44, wherein said forming step comprises axial cold pressing, isostatic cold pressing, slip casting, extruding, or foil casting.

46. A method of making a thermal insulating part, comprising (a) forming said part from a thermal insulating material comprising a first component with at least one first phase, which stoichiometrically contains (a) 1 to 80 mol-% of $M_2O_3$, (b) 0.5 to 80 mol-% MeO and (c) the remainder comprising $Al_2O_3$, wherein M is selected from the group formed by lanthanum, neodymium and mixtures thereof, and Me is selected from the group formed by zinc, the alkaline earth metals, transition metals, the rare earths and mixtures thereof, wherein said forming comprises producing a ceramic foam; and (b) sintering said part.

47. A method according to claim 46, wherein said ceramic foam is made by a process comprising producing a slip of said insulating material in a solvent, filling a polymer foam with said slip; driving off said solvent; and heating said filled foam.

48. A method according to claim 47, wherein said heating is conducted at a temperature of from about 900° C. to about 1100° C.

49. A method according to claim 46, wherein said ceramic foam is made by a process comprising forming a suspension of said insulating material with a low viscosity polymer, foaming said polymer, and heating said foamed suspension.

50. A method according to claim 49, wherein said heating is conducted at a temperature of from about 900° C. to about 1100° C.

51. A method according to claim 49, wherein said low viscosity polymer is a polyurethane and said foaming is performed using a foaming gas/hardening agent.

52. A thermal insulating part made by a process according to claim 44.

53. A thermal insulating part of claim 52, wherein Me is selected from the group formed by magnesium, zinc, cobalt, manganese iron, nickel, chromium, europium, samarium and mixtures thereof.

54. A thermal insulating part of claim 52, wherein the first component contains 1 to 50 mol-% of $M_2O_3$ and 1 to 50 mol-% MeO.

55. A thermal insulating part of claim 54, wherein the first component contains about 5 to 10 mol-% of $M_2O_3$ and about 10 to 20 mol-% MeO.

56. A thermal insulating part of claim 52, additionally comprising 0.001 to 20 wt.-% of a second component insoluble in the first component as a crystallisation aid for forming a hexa-aluminate phase.

57. A thermal insulating part of claim 52, wherein said insulating part follows the formula $M_2O_3$-xMeO-y$Al_2O_3$, wherein M is selected from the group consisting of lanthanum and neodymium, $0.2 \leq x \leq 3.3$, and $10.0 \leq y \leq 13$.

* * * * *

UNITED STATES PATENT AND TRADEMARK OFFICE
CERTIFICATE OF CORRECTION

PATENT NO.         : 6,998,064 B2
APPLICATION NO. : 10/619215
DATED              : February 14, 2006
INVENTOR(S)        : Rainer Gadow and Guenter Schaefer It is certified that error appears in the above-identified patent and that said Letters Patent is hereby corrected as shown below:

Column 13, Line 62 (Claim 7):  insert --the-- before "alkali"

Column 15, Line 18 (Claim 20):  insert --the-- before "alkali"

Signed and Sealed this

Twenty-ninth Day of August, 2006

JON W. DUDAS
*Director of the United States Patent and Trademark Office*